(12) United States Patent
Vandrotti et al.

(10) Patent No.: US 12,266,055 B2
(45) Date of Patent: Apr. 1, 2025

(54) METHODS AND SYSTEMS FOR INTERACTING WITH 3D AR OBJECTS FROM A SCENE

(71) Applicant: Samsung Electronics Co., Ltd., Suwon-si (KR)

(72) Inventors: Basavaraja Shanthappa Vandrotti, Bangalore (IN); Ankit Dhiman, Bangalore (IN); Akshunn Jindal, Bangalore (IN); Shashi Kumar Parwani, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 18/154,415

(22) Filed: Jan. 13, 2023

(65) Prior Publication Data

US 2023/0222736 A1 Jul. 13, 2023

Related U.S. Application Data

(63) Continuation of application No. PCT/KR2023/000667, filed on Jan. 13, 2023.

(30) Foreign Application Priority Data

Jan. 13, 2022 (IN) .............................. 202241002071
Jan. 12, 2023 (IN) ............................. 2022 41002071

(51) Int. Cl.
*G06T 17/20* (2006.01)
*G06T 7/12* (2017.01)
(Continued)

(52) U.S. Cl.
CPC ................ *G06T 17/20* (2013.01); *G06T 7/12* (2017.01); *G06T 7/62* (2017.01); *G06T 7/70* (2017.01); *G06V 10/25* (2022.01); *G06V 10/46* (2022.01)

(58) Field of Classification Search
CPC .. G06T 17/20; G06T 7/12; G06T 7/62; G06T 7/70; G06V 10/25; G06V 10/46
See application file for complete search history.

(56) References Cited

U.S. PATENT DOCUMENTS 8,577,080 B2 11/2013 Lin
9,501,848 B2 11/2016 Wilensky et al.
(Continued)

FOREIGN PATENT DOCUMENTS

CN 112053370 A 12/2020
KR 10-2013-0017258 A 2/2013
(Continued)

OTHER PUBLICATIONS

International Search report dated Apr. 14, 2023, issued in International Patent Application No. PCT/KR2023/000667.
(Continued)

*Primary Examiner* — Sing-Wai Wu
*Assistant Examiner* — Khoa Vu
(74) *Attorney, Agent, or Firm* — Jefferson IP Law, LLP

(57) ABSTRACT

A method and system for generating three-dimensional (3D) model augmented related objects from a scene are provided. The method includes creating one or more 3D objects and placing the 3D objects into the 3D scene. Embodiments herein disclose methods and systems for generating 3D augmented reality (AR) objects from a scene. The method may capture an object from the scene, perform a coarse semantic segmentation on the identified object, derive connected contour, generate intermediate contour from at least one outer and inner contours, and configure three-dimensional mesh and texture mapping to generate a three-dimensional model of the captured object.

18 Claims, 9 Drawing Sheets

(51) Int. Cl.
*G06T 7/62* (2017.01)
*G06T 7/70* (2017.01)
*G06V 10/25* (2022.01)
*G06V 10/46* (2022.01)

(56) References Cited

U.S. PATENT DOCUMENTS

| | | | | |
|---|---|---|---|---|
| 2006/0290695 | A1* | 12/2006 | Salomie | G06T 17/20 |
| | | | | 345/423 |
| 2016/0042511 | A1* | 2/2016 | Chukka | G06V 20/695 |
| | | | | 382/133 |
| 2018/0211438 | A1* | 7/2018 | Gonzalez Aguirre | G06T 17/00 |
| 2021/0004933 | A1* | 1/2021 | Wong | G06T 7/174 |
| 2021/0012551 | A1 | 1/2021 | Cowburn et al. | |
| 2021/0090346 | A1 | 3/2021 | Price et al. | |
| 2021/0201587 | A1 | 7/2021 | Mehr et al. | |
| 2021/0243362 | A1* | 8/2021 | Castillo | G06V 10/26 |
| 2021/0407192 | A1 | 12/2021 | Nunez et al. | |
| 2022/0207811 | A1 | 6/2022 | Zhang et al. | |
| 2022/0292773 | A1* | 9/2022 | Liu | G06N 3/096 |
| 2022/0292774 | A1* | 9/2022 | Yang | G06N 3/09 |
| 2024/0203138 | A1* | 6/2024 | Phalak | G06V 20/20 |

FOREIGN PATENT DOCUMENTS

| | | |
|---|---|---|
| KR | 10-1552827 B1 | 9/2015 |
| KR | 10-2276044 B1 | 7/2021 |
| KR | 10-2021-0111052 A | 9/2021 |

OTHER PUBLICATIONS

Indian Examination report dated Feb. 18, 2025, issued in Indian Patent Application No. 202241002071.

* cited by examiner

METHODS AND SYSTEMS FOR INTERACTING WITH 3D AR OBJECTS FROM A SCENE

CROSS-REFERENCE TO RELATED APPLICATION(S)

This application is a continuation of International Application No. PCT/KR2023/000667, filed on Jan. 13, 2023, which is based on and claims the benefit of an Indian Provisional patent application number 202241002071, filed on Jan. 13, 2022, in the Indian Intellectual Property Office, and of an Indian Complete patent application number 202241002071, filed on Jan. 12, 2023, in the Indian Intellectual Property Office, the disclosures of each of which are incorporated by reference herein in their entireties.

TECHNICAL FIELD

The disclosure relates to generating an Augmented reality (AR) model. More particularly, the disclosure relates to selecting objects present in an AR scene.

BACKGROUND

Augmented reality (AR) applications may provide a digital representation of a real-world environment to the users and may enable the users to experience actual size and dimensions of the real-world environment in a digital representation. In an example, the digital representation may be displayed to the user using a wearable device which may include, but not limited to virtual reality (VR) wearables, AR wearables, high-resolution AR and VR wearables, AR headset and the like.

Currently, most applications provide augmented reality related services from a pre-stored or existing real-world information to a virtual object. AR may be generated based on the pre-stored or existing information of real-world objects, virtual objects and other objects created by the users. The applications may use pre-stored information to generate a three-dimensional model of any real-world object captured through any application, for the purpose of augmentation in AR applications.

Existing applications such as AR canvas, enable the user to create and allocate virtual objects into three-dimensional scenes using a smartphone or any other user device. Most of the current applications provide the users with a pre-defined set of three-dimensional object models for the users for use in the three-dimensional (3D) model. Currently, the existing systems do not allow the user to select objects from the real-world to be created and placed as a virtual object in the three-dimensional scene.

FIG. 1A illustrates an example scenario, wherein the AR related model is generated from pre-stored real-world information to provide a virtual object. Most of the applications use information of the pre-stored or existing models from the storage to generate the AR related three-dimensional model. As illustrated in FIG. 1A, in an example scenario, wherein a digitalized object such as a 'cat' may be generated from the pre-stored real-world information.

Another example scenario, depicted in FIG. 1A, illustrating an AR model of 'penguin' generated from the existing real-world penguin image.

The above information is presented as background information only to assist with an understanding of the disclosure. No determination has been made, and no assertion is made, as to whether any of the above might be applicable as prior art with regard to the disclosure.

OBJECTS

Aspects of the disclosure are to address at least the above-mentioned problems and/or disadvantages and to provide at least the advantages described below. Accordingly, an aspect of the disclosure is to provide methods and systems for capturing and selecting at least one object from a scene captured in an image and placing as a three-dimensional model in a AR scene.

Another aspect of the disclosure is to provide methods and systems for capturing and selecting at least one object, wherein the user may select any real-world object from the surrounding to generate 3D AR related model.

Another aspect of the disclosure is to provide methods and systems for generating a realistic 3D AR related model to reflect the real-world objects that may be re-used and shared accordingly.

Another aspect of the disclosure is to provide methods and systems to enable interaction with objects from the scene, wherein the method may capture the scene, segment the foreground scene/object, detect major 3D contour(s) from the foreground scene, perform 3D object creation & texture mapping, and saving and restoring the 3D object.

Additional aspects will be set forth in part in the description which follows and, in part, will be apparent from the description, or may be learned by practice of the presented embodiments.

SUMMARY

Accordingly, the embodiments herein provide methods and systems for generating a three-dimensional model. In accordance with an aspect of the disclosure, a method is provided. The method includes identifying at least one object captured by a media acquisition unit associated with a region of interest (ROI) based on an objectness score. The method further includes performing a coarse semantic segmentation on the identified at least one object and derive a connected contour for the identified object, wherein the connected contour uses a plurality of anchor points. The method includes generating at least one intermediate contour from at least one outer and inner contours based on at least one gradual transformation to support a height parameter. The method further includes configuring at least one object with a three-dimensional mesh, wherein a texture mapping is performed on the at least one object to generate three-dimensional model of the captured at least one object.

In accordance with another aspect of the disclosure, a system for three-dimensional model is provided. The system includes a media acquisition unit, a processor, an augmented reality (AR) controller coupled to the processor, configured to identify at least one object captured by a media acquisition unit associated with a region of interest (ROI) based on an objectness score, perform a coarse semantic segmentation on the identified at least one object, derive a connected contour for the identified object, wherein the connected contour uses a plurality of anchor points, generate at least one intermediate contour from the at least one outer and inner contours based on at least one gradual transformation to support a height parameter, configure at least one object with a three-dimensional mesh, wherein a texture mapping is performed on the at least one object to generate three-dimensional model of the captured at least one object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
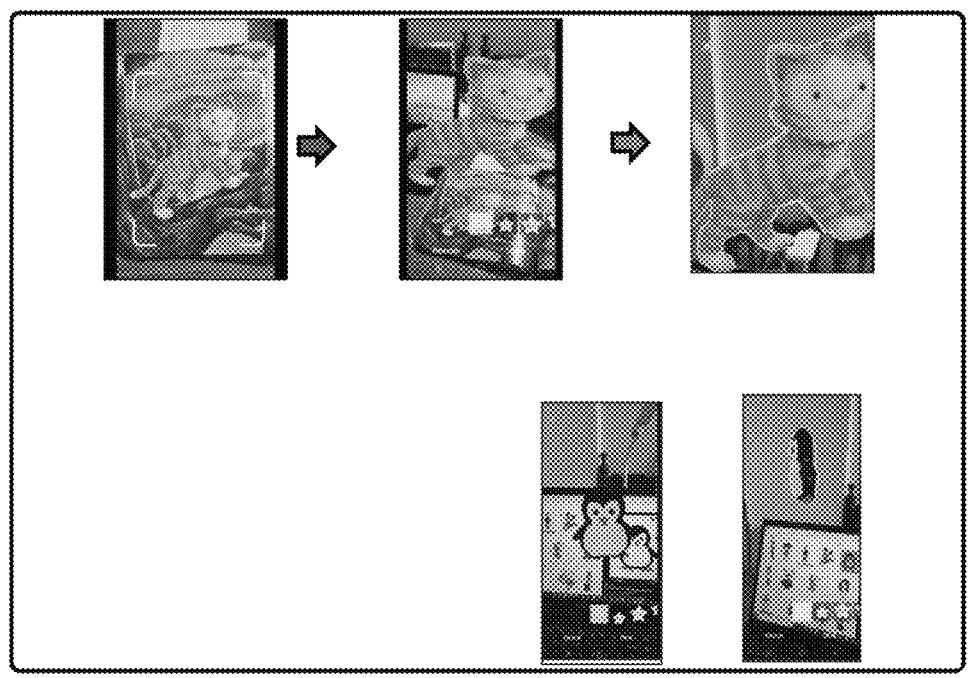
FIG. 1A illustrates an example scenario where an AR related model is generated from a pre-stored real-world information to provide a virtual object, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein provide methods and systems for generating a three-dimensional related model by capturing and selecting at least one object from a scene. Referring now to the drawings, and more particularly to FIGS. 1B, 2, 3, 4, 5, 6A, 6B, 7, and 8, where similar reference characters denote corresponding features consistently throughout the figures, there are shown at least one embodiment.

Embodiments herein disclose methods and systems for generating a three-dimensional related model from a scene, wherein at least one object is captured using a media acquisition unit associated with a ROI based on an objectness score. The identified at least one object may be segmented based on coarse and semantic segmentation, which may be used to determine the connected contour points of the identified at least one object by identifying a plurality of anchor points. Further, at least one intermediate contour may be generated from an identified outer and inner contours based on a gradual transformation to support height parameters. The captured at least one object may be converted to a three-dimensional mesh using a three-dimensional mesh and by applying a texture map to the captured at least one object.

Figure 1B:
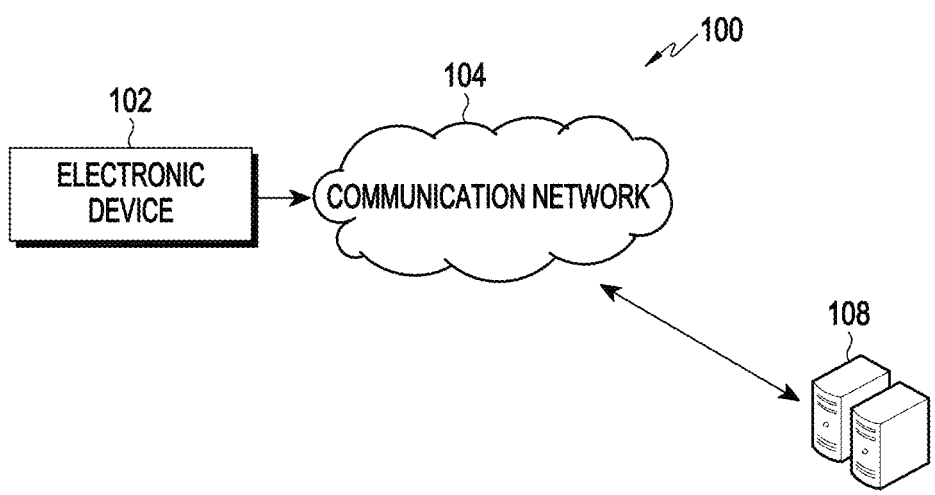
FIG. 1B illustrates an environment for generating an AR related model selected from a scene, capturing using an electronic device, according to an embodiment of the disclosure.

FIG. 1B illustrates an environment for generating an AR related model selected from a scene, capturing using an electronic device, according to an embodiment of the disclosure.

Referring to FIG. 1B, an environment 100 includes an electronic device 102, a communication network 104, and a server 108. The electronic device 102 may be connected to the server 108 through at least one of the communication network 104 or at least one other communication network (not shown).

The communication network 104 may include at least one of, but is not limited to, a wired network, a value-added network, a wireless network, a satellite network, or a combination thereof. Examples of the wired network may be but are not limited to, a local area network (LAN), a wide area network (WAN), an ethernet, and the like. Examples of the wireless network may be, but are not limited to, a cellular network, a wireless LAN (wireless fidelity (Wi-Fi)), Bluetooth, bluetooth low energy (BLE), Zigbee, Wi-Fi direct (WFD), ultra-wideband (UWB), infrared data association (IrDA), near field communication (NFC), or the like. In another example, the electronic device 102, and the databases is connected with each other directly and/or indirectly (e.g., via direct communication, via an access point, and the like). In another example, the electronic device 102, and the databases are connected with each other via a relay, a hub, and a gateway. It is understood that the electronic device 102, and the databases may be connected to each other in any of various manners (including those described above) and may be connected to each other in two or more of various manners (including those described above) at the same time.

The electronic device 102 referred to herein may be a device that analyzes the scene and captures the at least one object based on a user interest. The user may select the at least one object from the analyzed scene. The selected object may be segmented based on the coarse segmentation and the semantic segmenting, based on which the contour may be generated. The coarse segmentation may refer to a process in which the at least one object may be broken into a plurality of large blocks, wherein these large blocks do not contain much detail. Semantic segmentation may refer to a process of clustering parts of the captured image together which belong to a same category. Semantic segmentation may include a pixel-level prediction, in which each pixel of the captured object/image may be classified based on a category, and may be performed on the coarsely segmented object selected from the scene.

A contour may be a curve/line or points joining all the points along the boundary of the selected at least one object having the same intensity. The contour may be used to analyze the shape and size of the identified at least one object from the scene. The contour may be generated based on the plurality of anchor points. The plurality of anchor points may be pre-defined points surrounding the at least one object with a certain height and width. The plurality of anchor points may be defined, so as to capture the scale and aspect ratio of the at least one object selected from the scene. An intermediate contour may be generated based on the outer and inner contours obtained from the anchor points. The outer and inner contours may be generated based on the gradual transformation of the identified object. Further, the 3D AR related model may be generated by configuring a 3D mesh, wherein a texture mapping may be performed on the identified object.

The server 108, referred to herein, may be a server that receives, stores, and manages device information mappings, functional capabilities, manufacturer provided information, and location information of the electronic device 102 present in a network environment. The device information may include information such as, but is not limited to, an identification value (e.g., device identifier (ID) information/unique identifier) of the electronic device 102, a device type, and the like. In an example herein, the identification value/device ID information may be, but is not limited to, a media access control (MAC) identifier (MAC ID), a serial number, a unique device ID, and the like. The location information includes information about a location of the electronic device 102. The manufacturer provided information of the electronic device 102 may include at least one of but is not limited to, a model of the electronic device 102, an operating system being used by the electronic device 102, a current version of the operating system being used by the electronic device 102, and the like. The cloud-based server may update the device information, the functional capabilities, and location information of the electronic device 102, in the cloud environment.

The electronic device 102 may be configured with the at least one media acquisition unit, using which the user may analyze and capture the at least one object from the scene. The electronic device 102 referred to herein may be configured to analyze and capture the at least one object from the scene. Examples of the electronic device 102 maybe, but are not limited to, a smartphone, a mobile phone, a video phone, a computer, a tablet personal computer (PC), a laptop, a wearable device, a personal digital assistant (PDA), an IoT device, or any other device that comprises at least one media acquisition unit or may receive media from the at least one media acquisition unit.

Figure 2:
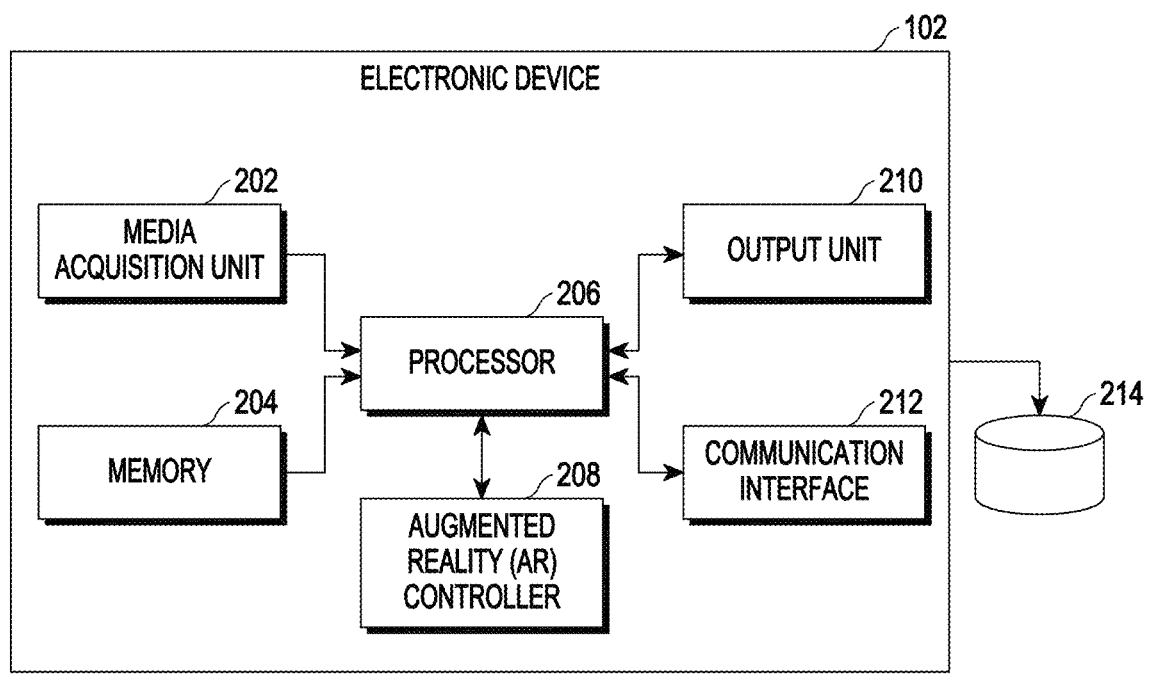
FIG. 2 depicts a block diagram illustrating various units of an electronic device for capturing and selecting at least one object from the scene, according to an embodiment of the disclosure.

FIG. 2 depicts a block diagram illustrating various units of the electronic device 102 for capturing and selecting the at least one object from the scene, according to an embodiment of the disclosure. The electronic device 102 may comprise the media acquisition unit 202, a memory 204, a processor 206, an AR controller 208, an output unit 210, a communication interface 212, and a database 214.

Referring to FIG. 2, the media acquisition unit 202 may be configured to capture media inputs (which may be a video, an image, or any other form of media) from the scene. The media acquisition unit 202 may be configured to detect and capture the at least one object from the scene. The media acquisition unit 202 may be configured to capture the media inputs from an environment comprising default objects such as normal images, group images, landscape images, nature images, candid images, family images, and the like. The objects referred to herein may include, but are not limited to human beings, living things, non-living things, and the like which may be used in the field of gaming, education, movies, architecture, engineering, retail, AR applications, automobile, fashion and the like. Examples of the media inputs may be, but are not limited to video, image, animations, scans, and the like.

The media acquisition unit 202 referred to herein may be any kind of device used to capture the media. The media acquisition unit 202 may be, but not limited to, digital camera, media capturing device, web camera, single-lens reflex (SLR), digital SLR (DSLR), mirrorless cameras, compact cameras, video recorders, digital video recorders and the like. The media referred to herein may be, but not limited to video, image and the like captured using the media acquisition unit 202. The objects may be analyzed from the captured media. For an instance, the user may focus the scene using the media acquisition unit 202 comprising the objects, the user may then select the object to be converted to a 3D AR related model.

The memory 204 of the electronic device 102 may store at least one of, but is not limited to, an information related to the at least one object analyzed and captured from the scene by the media acquisition unit 202. The memory 204 may also include the at least one object selected by the user from the captured scene using the media acquisition unit 202. The memory 204 referred to herein may include at least one type of storage medium, from among a flash memory type storage medium, a hard disk type storage medium, a multi-media card micro type storage medium, a card type memory (e.g., a secure digital (SD) or an extreme digital (XD) memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 212 may include one or more components using which the electronic device 102 may communicate with another device (e.g., another electronic device, the server 108, and the like) using data communication methods that are supported by the communication network 104. The communication interface 212 may include components such as, a wired communicator, a short-range communicator, a mobile/wireless communicator, and a broadcasting receiver. The wired communicator may enable the electronic device 102 to communicate with the other devices (e.g.: another electronic device, the cloud-based server, the plurality of devices, and the like) using the communication methods such as, but not limited to, wired LAN, the Ethernet, and the like. The short-range communicator may enable the electronic device 102 to communicate with the other devices using the communication methods such as, but is not limited to, BLE, NFC, WLAN (or Wi-fi), Zigbee, IrDA, WFD, ultrawide band communication, Ant+ (interoperable wireless transfer capability) communication, shared wireless access protocol (SWAP), wireless broadband internet (Wibro), wireless gigabit alliance (WiGiG), and the like.

The processor 206 may comprise one or more processors. The one or more processors may be a general-purpose processor, such as a central processing unit (CPU), an application processor (AP), and the like, a graphics-only processing unit such as a graphics processing unit (GPU), a visual processing unit (VPU), and/or an AI-dedicated processor such as a neural processing unit (NPU). The processor 206 may be configured to generate 3D AR related models from the captured at least one object using the media acquisition unit 202 of the electronic device 102.

The user, using the media acquisition unit 202 of the electronic device 102, may select the at least one object to be generated in the 3D AR environment. On analyzing the scene, the user may select the at least one object from the scene which may be generated into the 3D AR environment. Therefore, the processor 206 may be configured to generate the 3D AR object into the 3D environment, wherein the 3D generated model may be blended into 3D real-world scene.

The processor 206 may be configured to analyze the focused scene using the media acquisition unit 202, wherein the user may select the at least one object to be generated in the 3D AR model into the 3D environment. The scene may comprise one or more objects, from which the user may select the object based on a ROI associated to an objectness score. The ROI may refer to the process of selecting the at least one object from the plurality of objects on the scene. The ROI may refer to a subset of an image or a dataset identified based on the user interest. The user may select a ROI from the analyzed scene to generate the 3D AR related model.

The processor 206 may be configured to identify the at least object from the analyzed scene based on the objectness of the at least one object. The objectness of the at least one object may be measured to identify the objectness score from the captured scene. The objectness score may be a measure to indicate that the at least one object exists in the proposed ROI. High objectness score may specify that the image window may contain an object. The processor 206 may be configured to segment the identified at least one object from the analyzed object. The coarse segmentation and semantic segmentation may be performed on the captured at least one object.

The processor 206 may be configured to perform the coarse segmentation. The coarse segmentation may refer to a rough segmentation of the identified at least one object from the media. Semantic segmentation may refer to the process of clustering the parts of the captured image together which belong to the same category. The category may be a same object or different object category. Semantic segmentation may form a pixel-level prediction, in which each pixel of the captured object/image may be classified based on the category. Semantic segmentation may be performed on the coarsely segmented object selected from the scene.

The processor 206 may be further configured to obtain a connected contour for the identified at least one object from the scene. The connected contour may be derived based on identifying a plurality of anchor points on the segmented at least one object captured from the scene. The plurality of anchor points may refer to positioned points on the segmented objects with respect to the processed pixels, while capturing the objects from the scene. The contour is a curve/line or points joining all the continuous points along the boundary of the selected at least one object having the same intensity.

The processor 206 may be configured to generate intermediate contours from the identified outer and inner contours by performing a gradual transformation to support the height parameter of the identified at least one object on the scene. The intermediate contour of the object is identified by the outer and inner contours for generating the three-dimensional model in an AR. The intermediate contour of the object is generated based on selecting minimal data points to fit the outer and inner contours through multiple and smooth contour. The processor 206 may be configured to select a subset of anchor points from the identified plurality of anchor points. The subset of anchor points may be used to obtain the outer and inner contours of the identified contour points of the object. The outer and inner contours may be generated based on the gradual transformation of the identified object. The gradual transformation may refer to making intermediate contours elevated with different height. The outer contours refer to the outline of an object i.e., connecting all the points of the outside of the identified object. The inner contours may refer to inside of the identified object in the form of outline.

The plurality of anchor points is identified based on a sampling technique. At least one anchor point is selected from the connected contour of the identified object to obtain a smooth contour optimal to cover the identified object. The sampling technique may be performed by processing the position of at least one preceding point corresponding to at least one succeeding point of the plurality of anchor points of the identified object. Thereafter, comparison of the position of the preceding point and the succeeding point with a threshold is performed. The threshold is obtained based on a sampling factor. If it is determined that at least one point exceeds the threshold, then the point is retained. If it is determined that at least one point falls below the threshold, then the point is discarded.

In an embodiment herein, the intermediate contour of at least one object may be generated by configuring the outer and inner contours based on a delaunay triangulation technique. Further, triangles of the outer and inner contours may be filtered with a centroid pixel in a black region. Thereafter, the height parameter may be assigned based on a distance of at least one pixel in the intermediate contour.

The processor 206 may be configured to generate a 3D mesh for the contoured object, wherein the contoured object is a 2D object identified from the scene. The 3D mesh may represent the contoured object with a plurality of vertices and polygons. In an embodiment herein, the 3D object representation may be a polygon mesh, which comprises a plurality of vertices and polygons, wherein the plurality of vertices and polygons defines the shape of the contoured at least one object.

The 3D mesh provides a structural outline to define the shape of the identified at least one object with height, width and depth of the object, wherein the outline comprises polygons with the reference points in x, y, and z-axis. Examples of polygons may be, but not limited to, quadrangles, triangles, any other suitable other geometric shape, which may be further broken into vertices in x, y, and z co-ordinates and lines. The 3D model may be obtained by applying a 3D mesh and texture mapping on the identified at least one object. Texture mapping refers to the process of graphically designing the two-dimensional surface, called a texture map, which may be wrapped around the generated 3D object. Texture mapping may also refer to a method for defining high frequency details, surface texture, or color information on the generated 3D model. In an embodiment herein, texture mapping may use diffuse mapping, wherein the pixels are mapped from a texture map to a 3D surface. The 3D objects may obtain a surface texture similar to that of the 2D surface. Therefore, the 3D model may be a smooth 3D object, wherein the 3D object may be obtained by performing 3D mesh and texture mapping to the contoured object. Texture mapping may be performed by mapping the vertex co-ordinates of the at least one object to the texture co-ordinates using the cuboidal texture mapping technique. Cuboidal texture mapping may be performed using the offset for continuity of texture along the sides of the at least one object.

3D mesh may be generated using a 2D triangulation by plotting the points of inner, outer and intermediate contours. Filtering out all triangles whose centroid pixels are present in black region and based on the distance value of pixel in intermediate contour by assigning a z-value. Values for points in intermediate contour may be a function of distance from boundary pixels. Further, filling any holes caused by assigning the z-value to the intermediate contour. Thus, the above-mentioned process may generate one half of the 3D mesh around the z-axis, which may be mirrored to generate mesh around z-axis to generate the full 3D mesh.

The AR controller 208 may be configured to generate the AR related 3D model of the identified at least one object from the scene. AR referred to herein may refer to integration of digital information with the user's environment in real-time. By using AR, the user may experience a real-world environment with a generated perceptual information on top of it. The AR may be a live, direct or indirect, view of a physical, real-world environment in which the elements may be augmented using the captured at least object by the processor 206. The AR controller 208 may be configured to generate an AR related model, by enhancing the current perception of reality from the captured at least one object by the media acquisition unit 202 of the electronic device 102. The 3D AR related model may refer to models that are built and optimized for use with AR. Models may refer to creating a digital replica of the captured at least one object in 3D with size and scale to match the captured object of the captured scene.

The communication interface 212 may include one or more components, which enable the electronic device 102 to communicate with another device (e.g., the IoT devices, the IoT server (not shown)) using the communication methods that are supported by the communication network 104. The communication interface 212 may include the components such as a wired communicator, a short-range communicator, a mobile/wireless communicator, and a broadcasting receiver.

The wired communicator may enable the electronic device 102 to communicate with the other devices using the communication methods such as, but are not limited to, wired LAN, Ethernet, and the like. The short-range communicator may enable the electronic device 102 to communicate with the other devices using the communication methods such as, but are not limited to, BLE, NFC, WLAN (or Wi-fi), Zigbee, IrDA, WFD, UWB communication, Ant+ (interoperable wireless transfer capability) communication, SWAP, Wibro, WiGiG, and the like. The mobile communicator may transmit/receive wireless signals with at least one of a base station, an external terminal, or a server on a mobile communication network/cellular network. For example, the wireless signal may include a speech call signal, a video telephone call signal, or various types of data, according to transmitting/receiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 102 may or may not include the broadcasting receiver.

The output unit 210 may be configured to display the 3D related AR model which may be captured and selected by the user from the scene. The output unit 210 may include at least one of, for example, but is not limited to, a display, a User Interface (UI) module, a light-emitting device, and the like, to display the generated 3D related AR model captured from the scene. The UI module may provide a specialized UI or graphical user interface (GUI), or the like, synchronized to the electronic device 102, according to the applications. The output unit 210 may be configured to store the generated 3D related AR model/objects in the memory 204. The stored 3D related AR model/object may be re-used/customized in the future. The output unit 210 may fetch the stored 3D AR model/object based on user requirements.

Figure 3:
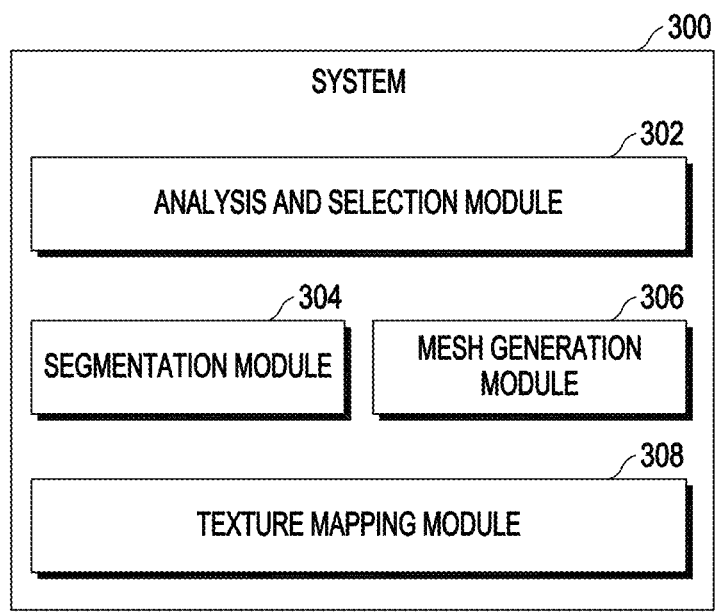
FIG. 3 depicts a block diagram illustrating various modules of a system in which a 3D AR model is generated from the captured objects, according to an embodiment of the disclosure.

FIG. 3 depicts a block diagram illustrating various modules of a system 300 in which three-dimensional AR model is generated from the captured objects, according to an embodiment of the disclosure.

Referring to FIG. 3, the system 300 comprises an analysis and selection module 302, a segmentation module 304, a mesh generation module 306 and a texture mapping module 308.

The analysis and selection module 302 may be configured to identify and select the at least one object from the scene. The selection module 302 may be configured to measure the objectness of the object in a focused scene associated with a ROI and select the at least one object based on the objectness score. The objectness score may be a measure to indicate that the at least one object exists in the proposed ROI. High objectness score may specify that the image window may contain an object. In an embodiment herein, the selected object may be the object with the highest objectness score. The objectness score may be obtained based on at least one seed point selected from the identified at least one object. Seed point may be a point in the image, wherein the objectness score is high. The selection of the seed point(s) may be performed based on the criteria such as pixels in a certain grayscale range, pixels evenly spaced on a grid and the like. The analysis and selection module 302, on determining the ROI, may determine the centroid of each region. The resulting centroid pixel of the identified ROI may be considered as the seed points of the identified at least one object on the captured scene. The media acquisition unit 202 may capture an initial region from the ROI. The initial region may originate from the location of the seed points, wherein the region may then grow from the seed points to adjacent points based on criteria. The criteria may be based on semantic segmentation of the at least one object and the like.

The analysis and selection module 302 may be configured to identify the at least one object by focusing on the scene using the media acquisition unit 202 associated with the ROI. The analysis and selection module 302 may be configured to check the stability of the at least one object with the parameters corresponding to x-axis, y-axis, and z-axis. The analysis and selection module 302 may identify the position of the at least one object using the co-ordinates and may calculate the difference in positions from the current and previous positions of the object (if any). The analysis and selection module 302 may check the stability of the object based on the determined differences in the position of the at least one object. The stability check may be performed based on the state of the device, wherein the device may be either in motion or in static state.

The segmentation module 304 may be configured to perform a coarse semantic segmentation of the identified at least one object. The segmentation module 304 may segment the selected at least one object into coarse and semantic segments based on which the contour may be generated. The coarse segmentation may be a process in which the at least one object may be broken into a plurality of large blocks, wherein these large blocks do not contain much detail. Semantic segmentation may refer to the process of clustering the parts of the captured media together which belong to a same category. Semantic segmentation may include a pixel-level prediction, in which each pixel of the captured object/image may be classified based on the categories. Semantic segmentation may be performed on the coarsely segmented object selected from the scene. The coarse semantic segmentation is performed by generating boundary with at least one point corresponding to at least one of x-axis, y-axis, and z-axis surrounding the identified object.

The contour is a curve/line or points joining all the points along the boundary of the selected at least one object having the same intensity. The contour may be used to analyze the shape and size of the identified at least object from the scene. The contour may be generated based on the plurality of anchor points. The plurality of anchor points may be the pre-defined points surrounding the at least one object with a certain height and width. The plurality of anchor points may be defined, so as to capture the scale and aspect ratio of the at least one object selected from the scene. An intermediate contour may be generated based on the outer and inner contours obtained from the anchor points.

The mesh generation module 306 may be configured to generate a 3D mesh structure for the contoured object. The mesh generation module 306 may provide the 3D mesh, representing the contoured object with a plurality of vertices and polygons. The mesh generation module 306 may provide the 3D polygon mesh with a plurality of vertices and polygons that defines the shape of the contoured object in 3D model.

The mesh generation module 306 may provide a structural outline to define the shape of the identified at least one object with height, width, and depth of the object, wherein the outline comprises polygons with the reference points in x, y, and z-axis. The co-ordinates refer to height, width, and depth of the contoured object. Examples of polygons may be, but not limited to, quadrangles, triangles, any other suitable geometric shapes, closed shapes formed by joining three or more-line segments with each other, shapes which may be broken into vertices in x, y, and z co-ordinates and lines.

The mesh generation module 306 may be configured to generate using a 2D triangulation by plotting the points of inner, outer and intermediate contours. Filtering out all the triangles whose centroid pixels are present in black region and based on the distance value of the pixel in intermediate contour by assigning a z-value. Values for points in intermediate contour may be a function of distance from the boundary pixels. Further, filling any holes caused by assigning the z-value to the intermediate contour. Thus, the above-mentioned process may generate one half of the 3D mesh around the z-axis, which may be mirrored to generate the mesh around z-axis to generate the full 3D mesh.

The texture mapping module 308 may be configured to provide a 3D graphical designing to the 2D object. The texture mapping module 308 may provide texture mapping to the 2D object to generate the 3D object by providing 2D surface, termed as texture map, which may be wrapped around to generate a 3D object. The texture mapping module 308 may also provide high frequency details, surface texture, color details, to the generated 3D model. In an embodiment herein, texture mapping may use diffuse mapping, wherein the pixels are mapped from a texture to a 3D surface. The 3D objects may obtain a surface texture similar to that of the 2D surface. Therefore, the 3D model may be a smooth 3D object, wherein the 3D object may be obtained by performing the 3D mesh and texture mapping to the contoured object.

Figure 4:
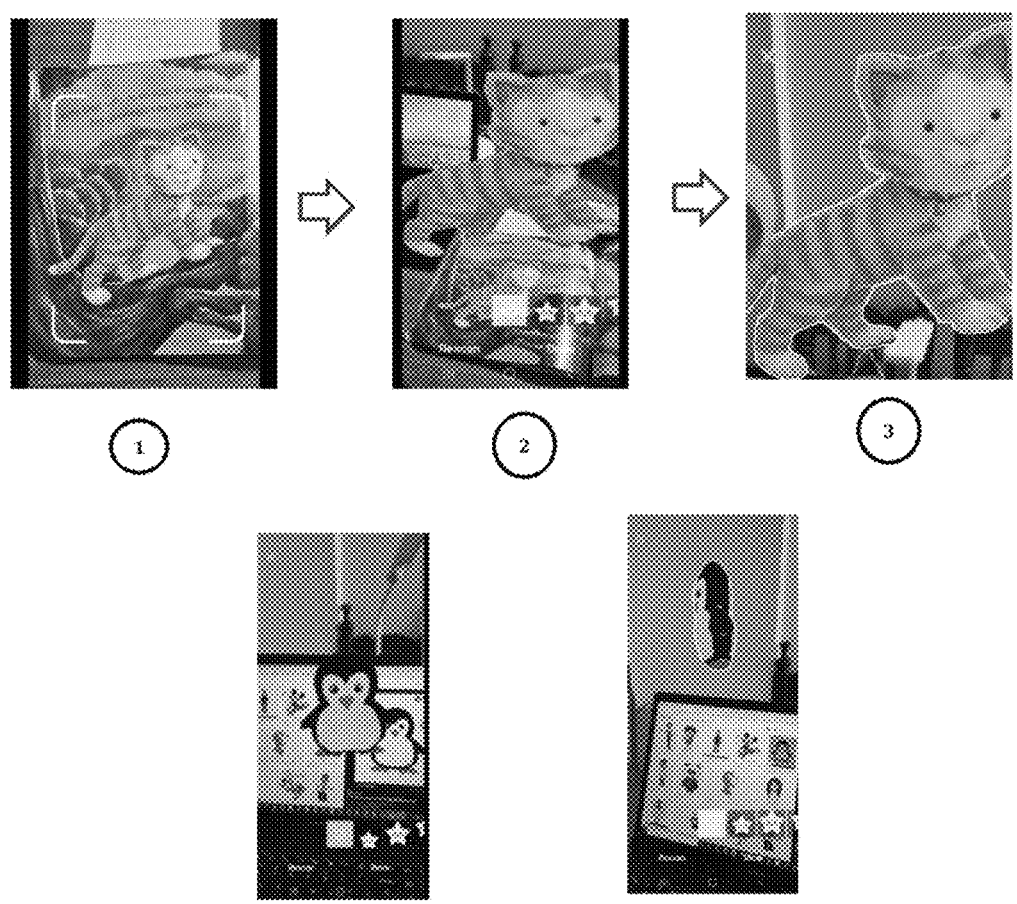
FIG. 4 is an example diagram illustrating identifying at least one object, segmenting of the identified at least one object and generating a 3D AR related model of the object, according to an embodiment of the disclosure.

FIG. 4 is an example diagram illustrating identifying at least one object, segmenting of the identified at least one object and generating a 3D AR related model of the at least one object, according to an embodiment of the disclosure.

Referring to FIG. 4, the user may use the electronic device 102 to focus the at least one object based on a ROI, on the scene. The electronic device 102 may measure the objectness score of the at least one object on the focused scene and may select the at least one object based on the objectness score. In an embodiment herein, the selected object may be the object with the highest objectness score.

The electronic device 102 may perform the coarse semantic segmentation of the identified object. The coarse segmentation comprises of breaking the object into the plurality of large blocks which may not comprise much detail. Semantic segmentation is the process of clustering the parts of captured object with more details to form a pixel-level segmentation. The semantic segmentation may be performed on the coarsely segmented object selected from the scene.

The electronic device 102 may identify, segment and crop the at least one object selected from the scene. The device may derive connected contour(s) for the identified at least one object by identifying a subset of anchor points from the plurality of anchor points identified on the contour to fit a smooth contour. The contour may be used to analyze the shape and size of the identified at least object from the scene. The contour may be generated based on the plurality of anchor points.

The electronic device 102 may generate one or more intermediate contours from the outer and inner contours by performing gradual transformation that may support heights. An intermediate contour may be generated based on the outer and inner contours obtained from the anchor points. The outer and inner contours may be generated based on the gradual transformation of the identified object. The outer contours refer to the outline of an object i.e., connecting all the points of the outside of the identified object. The inner contours may refer to inside of the identified object in the form of outline.

The intermediate contours may be generated based on each pixel on the image representing a vertex on an undirected graph, which may calculate the distance of each pixel on the white region from the nearest pixel in black region. Pixels which share a corner may have connected edge of sqrt(2). The pixels which share an edge, may have a connected edge of one. White region may be initialized to a distance of infinity, while black region may be initialized to zero. Breadth-first search may be applied to update the distance of pixels in the white region. Therefore, white pixel's approximate distance to the nearest black pixel may be calculated. The distance of pixels in white region may always be in between one and M, wherein "M" is the maximum distance of the interior pixel in the white region from the black region. Finally, intermediate contour may be generated by selecting pixels which have a distance "d" from the black region wherein 1<d<M.

The electronic device 102 may build the 3D mesh for the contoured 2D object selected from the scene. The electronic device 102 may provide the 3D mesh, representing the contoured object with a plurality of vertices and polygons. The 3D mesh may provide a structural outline of the identified at least one object with height, width and depth of the object, wherein the outline comprises polygons with the reference points in x, y, and z-axis.

The electronic device 102 may provide texture mapping to provide 3D graphical designing to the captured 2D object. Texture mapping may be provided to the 2D object using the texture map, which may be wrapped around the 2D object to generate the 3D object. Texture mapping may provide high frequency details, surface texture, color details, to the generated 3D model. The user may select any object in the real-world surrounding to render into the 3D AR related model rather than being restricted to selecting an object from a pre-defined set. Therefore, this helps in building a repository of captured 3D objects, which may be generated to a 3D AR related model. The generated 3D model may be blended with real-world 3D scenes which may be stored and re-used in the future.

Figure 5:
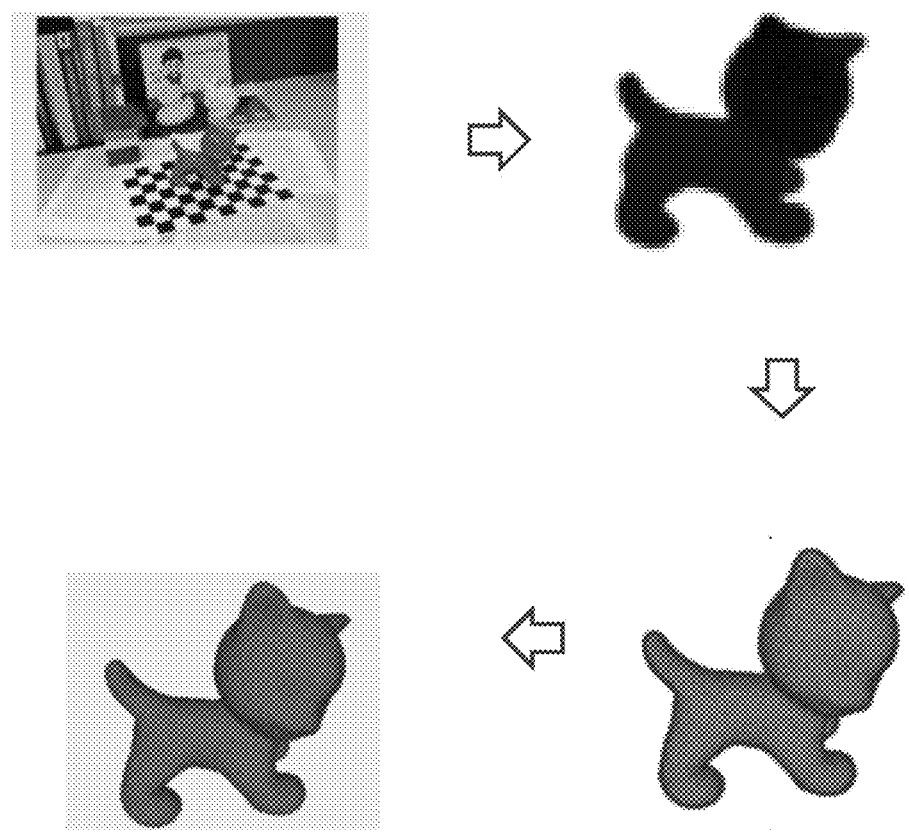
FIG. 5 is an example diagram illustrating the selection of at least one object from the scene and generating three-dimensional AR related model, according to an embodiment of the disclosure.

FIG. 5 is an example diagram illustrating the selection of at least one object from the scene and generating three-dimensional AR related model, according to an embodiment of the disclosure.

Referring to FIG. 5, the object may be selected from the scene using the objectness score based on the ROI and the object may be selected based on the objectness score. The device may perform coarse and semantic segmentation of the selected object. The coarse segmentation may be a process in which the object may be broken into a plurality of large blocks, wherein the plurality of large blocks may not comprise much detail. Semantic segmentation may form a pixel-level prediction, in which each pixel of the captured object/image may be classified based on the category. Semantic segmentation may be performed on the coarsely segmented object selected from the scene.

The contour may be used to analyze the shape and size of the identified at least object from the scene. The contour may be generated based on the plurality of anchor points. The plurality of anchor points may be pre-defined points surrounding the at least one object with a specific height and width. The plurality of anchor points may be defined to capture the scale and aspect ratio of the at least one object selected from the scene. The intermediate contour may be generated based on the outer and inner contours obtained from the anchor points. The outer and inner contours may be generated based on the gradual transformation of the identified object. The outer contours refer to the outline of an object i.e., connecting all the points of the outside of the identified object. The inner contours may refer to inside of the identified object in the form of outline.

The 3D mesh may be generated based on the contoured object, which may be a 2D object identified from the scene and may have a flaw-less 3D volume. Texture mapping may provide 3D graphical designing, by wrapping high frequency details, surface texture, color details around the 3D AR related object.

Figure 6A:
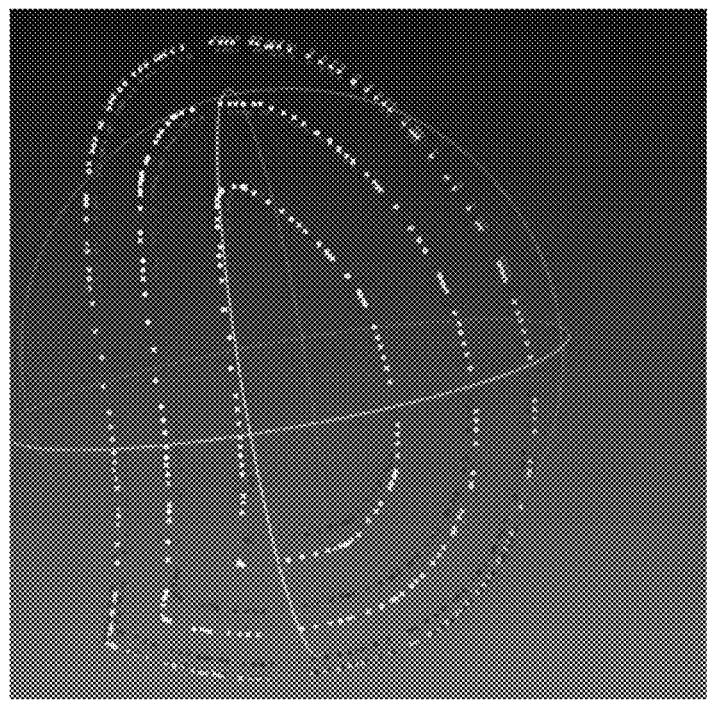
FIGS. 6A and 6B are example diagrams illustrating a process of generating intermediate contours from an obtained at least one outer and inner contour from a captured at least one object, according to various embodiments of the disclosure.
Figure 6B:
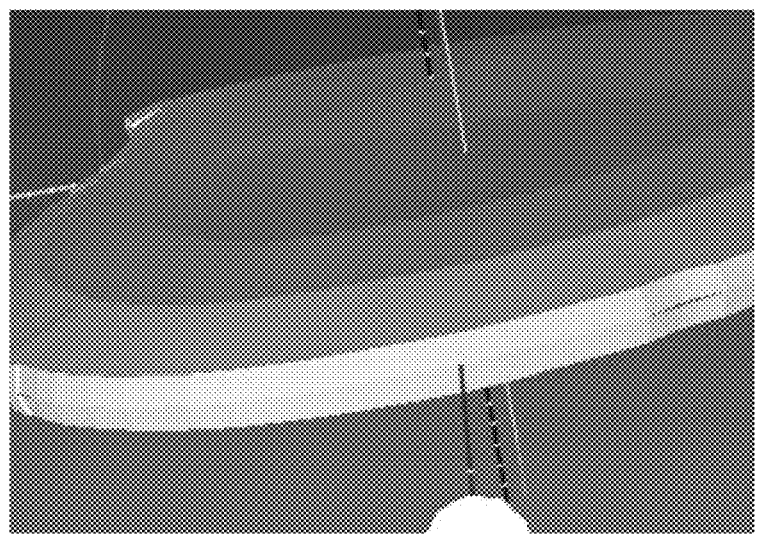

FIGS. 6A and 6B are example diagrams illustrating the process of generating intermediate contours from the obtained at least one outer and inner contours from the captured at least one object, according to various embodiments of the disclosure.

Referring to FIGS. 6A and 6B, the outer contour may be wrapped to the inner contour to obtain the intermediate contour. The outer and the inner contours may be generated based on the gradual transformation of the identified object. The contours may be obtained based on elevations of the object, in which straight lines may be drawn to the nearest neighboring spot elevations, beginning again with the next highest elevation. The contour may be performed until the entire surface of the object is completely triangulated. The outer contours refer to the outline of an object i.e., connecting all the points of the outside of the identified object. The inner contours may refer to inside of the identified object in the form of outline.

Referring to FIGS. 6A and 6B, the triangles may be generated using two-dimensional Delaunay triangulation procedure on the points of inner, outer and intermediate contours. Delaunay triangulation is a technique for creating a mesh of contiguous, non-overlapping triangles from a dataset of points of the identified object. The electronic device 102 may filter out all the triangles in the object whose centroid pixel is in black region. Further, based on the distance value of pixel in intermediate contours, the device may assign z-value to the contoured object. Delaunay triangulation for a given set "P" of the discrete points in a general position is the triangulation DT(P), wherein no point in P may be inside the circumcircle of any triangle in DT(P).

In another embodiment, as illustrated in FIG. 6A, points may be plotted in an undirected graph, representing the points between the pixels in the image. The distance of each white pixels from the nearest black pixel may be calculated. The pixels which share a corner with a connected edge of sqrt 2, the pixels which share an edge with the connected edge of 1. White region may be initialized to a distance of infinity while black region may be initialized to 0. Breadth first search (BFS) may be used to update the distance in the white region, to obtain the approximate distance of the white pixel to the nearest black pixel. Let the distance vary from 1 to M, in which the user may pick a value between 1 and M to use the pixel locations using which the value of distance as contour may be calculated.

Intermediate contours may be generated based on each pixel on the image representing a vertex on an undirected graph, which may calculate the distance of each pixel on the white region from the nearest pixel in black region. Pixels which share a corner may have connected edge of sqrt(2). The pixels which share an edge, may have a connected edge of one. White region may be initialized to a distance of infinity, while black region may be initialized to zero. Breadth-first search may be applied to update the distance of pixels in the white region. Therefore, white pixel's approximate distance to the nearest black pixel may be calculated. Distance of pixels in white region may always be in between one and M, wherein M is the maximum distance of interior pixel in the white region from the black region. Finally intermediate contour may be generated by selecting pixels which have a distance "d" from the black region wherein 1<d<M.

Figure 7:
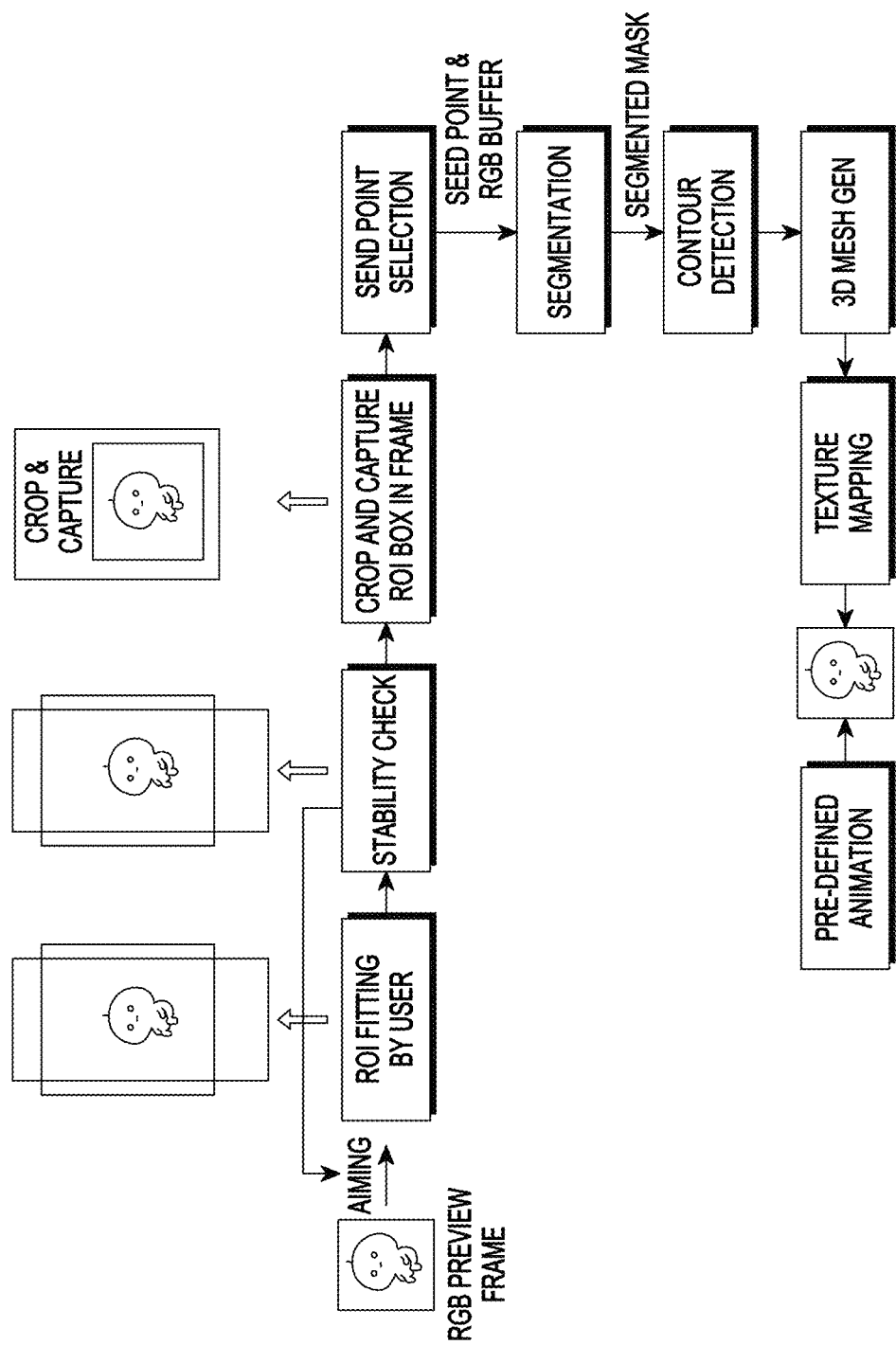
FIG. 7 is an example diagram illustrating a process of selecting and generating a three-dimensional AR related model, according to an embodiment of the disclosure.

FIG. 7 is an example diagram illustrating the process of selecting and generating three-dimensional AR related model, according to an embodiment of the disclosure.

Referring to FIG. 7, the user may use the media acquisition unit 202 to focus on the object, wherein the user may focus the object to fit in the focus point. For an instance, the focus point may be a rectangular box in which the user may bring the ROI fitted inside to bring focus to the object. ROI fitting may be performed automatically or by the user. The electronic device 102 may focus on the object to receive a red-green-blue (RGB) preview frame.

Further, in an embodiment herein, a stability check is performed, wherein the process of ROI fitting may be repeated, if the stability check fails. Embodiments herein may perform additional operations, such as, cropping and capturing a ROI box in the input media. Further, the electronic device 102 may perform seed point selection, wherein the seed point and the RGB buffer may be used for performing segmentation. Selection of the seed point may be performed based on criteria such as pixels in a certain grayscale range and pixels evenly spaced on a grid. The region on the scene may be captured using the media acquisition unit 202.

In another embodiment, the electronic device 102 may segment the selected object into coarse and semantic segments, based on which the contour may be generated. The coarse segmentation may be a process in which the object may be broken into large blocks without much detail. Semantic segmentation may refer to the process of clustering the parts of the captured image together which belong to the same category. Semantic segmentation may comprise a pixel-level prediction, in which each pixel of the captured object/image may be classified based on the category. Semantic segmentation may be performed on the coarsely segmented object selected from the scene.

The initial region begins with the location of the seed points, wherein the region then grows from the seed points to one or more adjacent points. The segmented mask may then be used for contour detection. The intermediate contour may be generated based on the outer and inner contours obtained from the anchor points.

Embodiments herein disclose generation of 3D mesh representing the contoured object with a plurality of vertices and polygons. Further, the texture mapping is performed to generate the 3D object by providing a 2D surface, termed as texture map, which may be wrapped around to generate the 3D object. Embodiments herein may comprise adding one or more pre-defined animations to the generated 3D object.

Embodiments herein disclose a faster way to create 3D models from scenes, as compared to existing solutions. Embodiments herein provide a 3D model that looks very close to real object(s) due to texture mapping. The generated model, as disclosed herein, may be stored, reused and shared. Embodiments herein provide an easy method to create the repository of 3D object(s). As embodiments herein only select the major contour, mesh creation may be easy. Embodiments herein may be used to provide an efficient instant usage and picking any object for 3D AR related model with the help of cluttered background, varied object poses and the like. Embodiments herein bridge the users by generating personalized objects other than the objects from the repository. Embodiments herein does not require any manual intervention for obtaining fine and final 3D AR related model.

Figure 8:
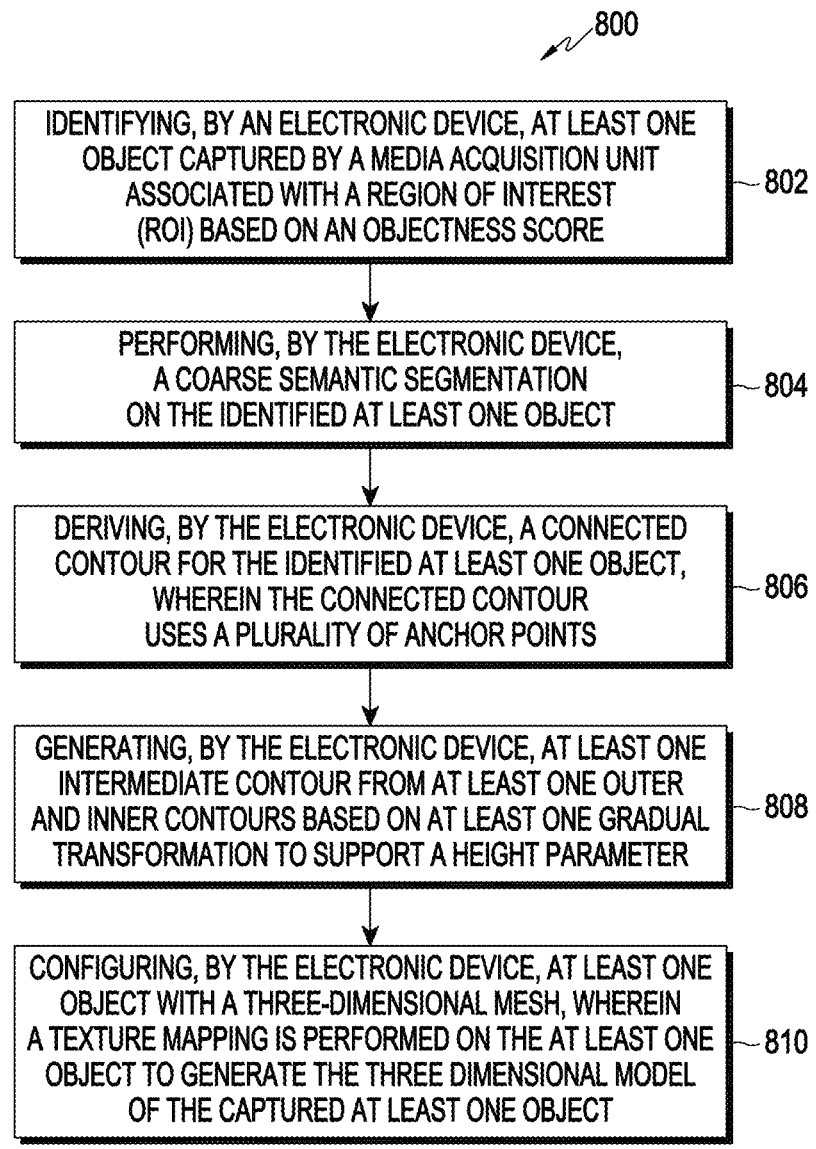
FIG. 8 is a flow diagram depicting a method for generating a three-dimensional related model, according to an embodiment of the disclosure.

FIG. 8 is a flow diagram depicting a method for generating three-dimensional related model, according to an embodiment of the disclosure.

Referring to FIG. 8, in a method 800, at operation 802, the method 800 may include, identifying, by an electronic device 102, at least one object captured by a media acquisition unit 202 associated with a ROI based on the objectness score. At operation 804, the method 800 includes, performing, by the electronic device 102, a coarse semantic segmentation on the identified at least one object. At operation 806, the method 800 may include, deriving, by the electronic device 102, a connected contour for the identified object, wherein the connected contour uses a plurality of anchor points. At operation 808, the method 800 may include, generating, by the electronic device 102, at least one intermediate contour from at least one outer and inner contours based on at least one gradual transformation to support a height parameter. At operation 810, the method 800 may include, configuring, by the electronic device 102, at least one object with a three-dimensional mesh, wherein a texture mapping is performed on the at least one object to generate three-dimensional model of the captured at least one object. The various actions in method 800 may be performed in the order presented, in a different order or simultaneously. Further, in some embodiments, some actions listed in FIG. 8 may be omitted.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for generating a three-dimensional model, the method comprising:
   identifying, by the electronic device, at least one object, captured by a camera of the electronic device, which is associated with a region of interest (ROI) based on an objectness score;
   performing, by the electronic device, a coarse semantic segmentation on the identified at least one object;
   deriving, by the electronic device, a connected contour for the identified at least one object, the connected contour using a plurality of anchor points;
   configuring, by the electronic device, at least one outer and inner contours based on a delaunay triangulation technique, the outer contour being an outline of an outside of the identified at least one object and the inner contour being an outline inside the identified at least one object;
   filtering, by the electronic device, triangles of the at least one outer and inner contours with a centroid pixel in a black region;
   assigning a height parameter based on a distance of at least one pixel in at least one intermediate contour of the at least one object; and
   configuring, by the electronic device, the at least one object with a three-dimensional mesh, wherein a texture mapping is performed on the at least one object to generate the three-dimensional model of the captured at least one object.

2. The method of claim 1,
   wherein the objectness score is based on at least one seed point selected from the at least one object, and
   wherein the at least one seed point is a point on an image with a high objectness score.

3. The method of claim 1,
wherein the identifying of the at least one object comprises:
focusing the at least one object, to be captured by the camera, which is associated with ROI, the ROI being determined based on a user interest on the at least one object; and
checking stability of the at least one object with parameters corresponding to at least one of an x-axis, a y-axis, or a z-axis based on a previous and current position of the at least one object, and
wherein the coarse semantic segmentation is performed by generating a boundary with at least one point corresponding to the at least one of the x-axis, the y-axis, or the z-axis surrounding the at least one object.

4. The method of claim 1, wherein the plurality of anchor points is identified based on a sampling technique, in which at least one anchor point is selected from the connected contour for the identified at least one object to obtain a smooth contour optimal to cover the identified at least one object.

5. The method of claim 4,
wherein the sampling technique is performed by:
processing a position of at least one preceding point corresponding to at least one succeeding point of the plurality of anchor points of the identified at least one object; and
comparing the position of the at least one preceding point and the at least one succeeding point with a threshold, wherein the threshold is obtained based on a sampling factor, and
wherein any of the at least one preceding point or any of the at least one succeeding point that is determined to exceed the threshold is retained, and any of the at least one preceding point or any of the at least one succeeding point that is determined to fall below the threshold is discarded.

6. The method of claim 1, wherein the connected contour is obtained by generating the at least one intermediate contour from the at least one outer and inner contours for transforming the height parameter.

7. The method of claim 1, wherein the at least one intermediate contour of the at least one object is identified by the at least one outer and inner contours for generating the three-dimensional model in an augmented reality (AR).

8. The method of claim 1, wherein the at least one intermediate contour of the at least one object is generated based on selecting minimal data points to fit the at least one outer and inner contours through multiple and smooth contour.

9. The method of claim 1, wherein the generated three-dimensional model of the captured at least one object is obtained by applying the three-dimensional mesh and the texture mapping of the identified at least one object.

10. The method of claim 1, wherein the at least one object is stored and re-used by fetching a previously created three-dimensional model, upon identifying the stored at least one object.

11. An electronic device for generating a three-dimensional model, the electronic device comprising:
a camera;
at least one processor; and
a memory,
wherein the at least one processor is configured cause the electronic device to:
identify at least one object, captured by the camera, which is associated with a region of interest (ROI) based on an objectness score,
perform a coarse semantic segmentation on the identified at least one object,
derive a connected contour for the identified at least one object, the connected contour using a plurality of anchor points,
configure at least one outer and inner contours based on a delaunay triangulation technique, the outer contour being an outline of an outside of the identified at least one object and the inner contour being an outline inside the identified at least one object,
filter triangles of the at least one outer and inner contours with a centroid pixel in a black region,
assign a height parameter based on a distance of at least one pixel in at least one intermediate contour of the at least one object, and
configure the at least one object with a three-dimensional mesh, wherein a texture mapping is performed on the at least one object to generate the three-dimensional model of the captured at least one object.

12. The electronic device of claim 11,
wherein the objectness score is based on at least one seed point selected from the identified at least object, and
wherein the at least one seed point is a point on an image with a high objectness score.

13. The system electronic device of claim 11,
wherein the at least one processor, when identifying the at least one object, is further configured to cause the electronic device to:
focus the at least one object, to be captured by the camera, which is associated with the ROI, the ROI being determined based on a user interest on the at least one object, and
check stability of the at least one object with parameters corresponding to at least one of an x-axis, a y-axis, or a z-axis based on a previous and current position of the at least one object, and
wherein the coarse semantic segmentation is performed by generating boundary with at least one point corresponding to the at least one of the x-axis, the y-axis, the z-axis surrounding the identified at least one object.

14. The electronic device of claim 11,
wherein the plurality of anchor points are identified based on a sampling technique, in which at least one anchor point is selected from the connected contour of the identified at least one object to obtain a smooth contour optimal to cover the identified at least one object,
wherein the at least one processor, when performing the sampling technique, is further configured to cause the electronic device to:
process a position of at least one preceding point corresponding to at least one succeeding point of the plurality of anchor points of the identified at least one object, and
compare the position of the at least one preceding point and the at least one succeeding point with a threshold,
wherein the threshold is obtained based on a sampling factor, and
wherein any of the at least one preceding point or any of the at least one succeeding point that is determined to exceed the threshold is retained, and any of the at least one preceding point or any of the at least one succeeding point that is determined to fall below the threshold is discarded.

15. The electronic device of claim 11, wherein the connected contour is obtained by generating the at least one intermediate contour from the at least one outer and inner contours for transforming the height parameter.

16. The electronic device of claim 11,
wherein a contour of the at least one outer and inner contours is used to analyze a shape and a size of the identified at least object from a scene, and
wherein the contour is generated based on the plurality of anchor points.

17. The electronic device of claim 16, wherein the plurality of anchor points are pre-defined points surrounding the at least one object with a specific height and width.

18. The electronic device of claim 16, wherein the plurality of anchor points is defined to capture a scale and aspect ratio of the at least one object selected from the scene.

\* \* \* \* \*